United States Patent [19]

Ribbing et al.

[11] Patent Number: 4,746,482

[45] Date of Patent: May 24, 1988

[54] METHOD FOR THE MANUFACTURE OF A THERMOPLASTIC MOLDING MATERIAL CONTAINING POLYPHENYLENE ETHER

[75] Inventors: Wilfried Ribbing, Dorsten; Hans Jadamus, Marl; Hans-Eberhard von Portatius, Dorsten, all of Fed. Rep. of Germany

[73] Assignee: HULS Aktiengesellschaft, Marl, Fed. Rep. of Germany

[21] Appl. No.: 947,273

[22] Filed: Dec. 29, 1986

[30] Foreign Application Priority Data

Feb. 7, 1986 [DE] Fed. Rep. of Germany ....... 3603798

[51] Int. Cl.$^4$ ............................................... B29B 7/84
[52] U.S. Cl. .................................... 264/102; 264/171; 264/211; 264/211.23; 264/349; 425/203; 425/204; 524/151; 525/68; 525/392; 525/905
[58] Field of Search ............... 264/102, 171, 101, 211, 264/DIG. 78, 211.23, 349, 143; 425/203, 204; 524/151; 525/68, 392, 905

[56] References Cited

U.S. PATENT DOCUMENTS

| | | | |
|---|---|---|---|
| 3,304,282 | 2/1967 | Cadus et al. | 264/349 |
| 3,410,938 | 11/1968 | Schippers | 264/102 |
| 3,621,091 | 11/1971 | Hertz et al. | 264/342 R |
| 4,369,278 | 1/1983 | Kasahara et al. | 264/102 |
| 4,402,902 | 9/1983 | Falk et al. | 264/349 |
| 4,547,541 | 10/1985 | Golba, Jr. | 264/349 |

*Primary Examiner*—Jeffery Thurlow
*Attorney, Agent, or Firm*—Oblon, Fisher, Spivak, McClelland & Maier

[57] ABSTRACT

The invention relates to a method for the manufacture of molding materials containing polyphenylene ether (PPE) and to the materials obtained according to this method. Molten PPE containing at least 0.1% volatile components is degasified until it reaches a residual content of volatile components of less than 500 ppm. Subsequently, additional molten polymers and/or additives are added to this molten mass at the lowest possible temperature and both components are mixed.

13 Claims, No Drawings

METHOD FOR THE MANUFACTURE OF A THERMOPLASTIC MOLDING MATERIAL CONTAINING POLYPHENYLENE ETHER

BACKGROUND OF THE INVENTION

1. Field of the Invention

The present invention is related to a method for the manufacture of thermoplastic materials containing polyphenylene ether (PPE) with a particularly low content of volatile components.

2. Discussion of the Background

It is known that thermoplastic materials can be manufactured by mixing in kneading machines in which the components are introduced in solid form, together or separately, in the desired mix ratios, and are mixed in the mixing zones during or after the melting process. In this process, the polymers are forcibly subjected to high mechanical and thermal stress. A method of this type yields unsatisfactory results with thermoplastic materials such as molding materials containing PPE, in which the admixed polymers are especially thermally and mechanically sensitive.

In order to avoid these disadvantages, it has been proposed, for example, in U.S. Pat. No. 3,383,435, to mix PPE and polystyrene at a lower temperature, particularly at temperatures between 232° C. and 254° C. Under these conditions, however, it is not possible to obtain a thorough mixture of both components. Therefore, even after a second extrusion, the objective is only a "more complete dispersion," but not a homogeneous mixture. If the temperature is raised to about 300° C., so that the mixing effect is improved, then damage to the thermally sensitive polymers is unavoidable.

Another method is to decrease the thermal and physical stress by conducting the mixing process in solution or even in the presence of viscosity-reducing additives and then subsequently removing these agents from the remainder of the mixed material. Thus, it is known to produce solutions containing PPE and a vinyl-aromatic resin and to extrude them, if necessary after an upgrading process, through a degasification extruder (See CA-PS No. 1,063,761). This application contains no information whatever relating to the degree of degasification achieved or relating to the quality of the thermoplastic materials obtained.

Two additional patents contain embodiments of this method. According to DE-OS No. 31 31 440 a 15 to 60% PPE-solution is combined with another polymer and the combined solution is freed of solvents in a multiple-stage evaporation process. The method in DE-OS No. 33 15 803 provides for the upgrading of a 5 to 50% PPE solution, combining the same with the melted mass of another polymer at shearing velocities of from 5 to 400 sec. with subsequent or simultaneous upgrading through evaporation. In both methods the thermo-sensitive polymer is subjected to significant thermal stress in the upgrading step, since it is known that the final residue of a solvent is particularly difficult to remove from a polymer. The lower the residue level of volatile components in the polymer that is required, the higher the temperature must be and, therefore, also the mechanical stress on the polymer. If one chooses to operate in the reverse at relatively low temperatures during the upgrading process, then a high proportion of residual volatile components must be expected.

A way out of this dilemma is offered by the teachings of EP-PS No. 0 048 154. According to this reference, mixtures of polyphenylene ethers and impact resistant polystyrenes are melted in an extruder, mixed and degasified at temperatures of about 280° C. The requirement for less than 5,000 ppm highly volatile components, however, can only be attained if the decomposition of the polystyrene components is suppressed by the addition of special inhibitors. But the presence of even 2,000–5,000 ppm of highly volatile components in such materials is still much too high, because during the manufacture of molded elements they cause the formation of clouded and streaked surfaces ("silver coating").

SUMMARY OF THE INVENTION

Accordingly, one object of the present invention is to develop a method for the manufacture of molding materials containing PPE, in which on the one hand a homogeneous blending of the components is assured, and on the other hand the thermal and mechanical stress on the polymers and additives is reduced to a minimum.

A further object of the invention is to develop molding materials which contain the smallest possible quantity of volatile components.

These objects and other objects of the invention which will become apparent from the following specification have been achieved by the novel molding materials and method of manufacturing the same of the present invention which comprises degasifying molten polyphenylene ether and then blending at least one additional molten polymer with said degasified molten polyphenylene ether.

DETAILED DESCRIPTION OF THE PREFERRED EMBODIMENTS

The molding materials should contain the smallest possible quantity of volatile components, preferably less than 500 ppm, and particularly less than 350 ppm. Counted among the volatile components are not only the solvent(s) in which the PPE was dissolved, but also impurities present in low concentrations in the commercial solvents employed, byproducts occurring in small quantities during the manufacture of the PPE, and oligomerous products up to mole masses of 300.

The additives consciously added to the PPE for stabilization or for other purposes, however, are not counted among the volatile components in the sense of this definition.

A method has now been discovered which allows molding materials containing PPE to be manufactured with these low proportions of volatile substances. The products manufactured according to this process have a light color and can be molded into elements with smooth, streak-free surfaces and especially good mechanical characteristics. The method is based on the fact that the PPE is degasified to such an extent in a method step prior to the mixing, that the proportion of volatile substances is less than 500 ppm, particularly less than 350 ppm, and the addition of additional polymers and additives takes place thereafter, without the necessity of additional degasification, which necessarily takes place under conditions which damage these materials.

Until now, such a thorough degasification of the unmixed PPE, which has a high melting point, was thought impossible because of the high melting viscosity of this polymer. This has now been accomplished for the first time; in contrast to the previously disclosed methods in which the PPE was always treated with viscosity reducing polymers such as polystyrene prior to the degasification step.

The PPE degasification can be performed in principle by means of known degasification apparatus using a vacuum, particularly in a force-feeding apparatus such as a degasification extruder with one or more degasification openings. It is crucial that the molten PPE mass is subjected to temperatures between 290° and 370° C., preferably 320°–350° C., in a vacuum of 2–50 hPa within a time period of 0.1 to 3 minutes shortly before and during the degasification. The gasification performance can be improved with entrainment feeding (See H. Werner, Kunststoffe, 71 (1), p. 18 (1981)), but is not absolutely necessary. It is advantageous if not only the highly volatile components such as solvents, but also lesser volatile, unstable and, above all, intensively dark colored materials are removed. The PPE handled in this manner has an especially light color and has high thermal resistance.

The subsequent admixture of other polymers and/or additives takes place under conditions which largely avoid damage to these substances.

The polymers and/or additives are melted and brought only to a slightly raised temperature, which on the one hand should lie as far beneath the temperature of the degasified PPE melt as possible, but on the other hand must be high enough that sufficient flowability is assured for the feed. The temperature to be set for the polymer, the additive or a mixture thereof depends on the type of additive selected. A person skilled in the art is capable of determining the optimal temperature for the conditions present. Especially favorable results are achieved if the temperature of the added molten polymer mass can be adjusted such that the viscosity of the molten PPE mass after its degasification and the viscosity of the molten polymer mass which is added are the same. A person skilled in the art can determine the viscosity of the molten PPE mass at the temperature which also prevails in the molten PPE mass after the degasification zone, e.g. with the aid of a high pressure capillarimeter, and can thus determine the temperature at which the added molten polymer has the same viscosity as the molten PPE. This method is particularly well suited for mixtures of PPE and polystyrene resins. Generally, this temperature lies between 150° and 250° C., particularly between 180° and 220° C.

In individual cases it is even possible to lower the temperature of the degasified PPE polymer before it is mixed with the other polymers and/or additives, so that an even more careful blending is possible.

The present method utilizes the fact that molten polymers of different temperatures but nearly equal viscosity can be blended particularly well. For this reason it is desired the relation $0.5 < X < 2$ holds, and preferably $0.8 < x < 1.2$ wherein X is the ratio of the viscosity of the PPE to the viscosity of the polymers and/or additives.

Available polymers for these purposes include homopolystyrene; caoutchouc-modified styrene polymers, caoutchoucs, i.e., raw or unvulcanized rubber of all types; polycondensates such as polyamides; as well as polyolefins such as polyethylenes and polypropylenes. The present methods is advantageously suited for the manufacture of the following materials:

(1) Thermoplastic materials based on polyphenylene ethers, impact resistant styrene polymers and powdered caoutchouc containing fillers as well as methods for their manufacture (See DE-OS No. 34 24 210);

(2) Thermoplastic materials based on polyphenylene ethers, styrene polymers and powdered caoutchouc containing fillers as well as methods for their manfacture (See DE-OS No. 34 34 705).

(3) Thermoplastic materials based on polyphenylene ethers and styrene-butadiene-emulsion polymers (See DE-OS No. 34 42 274).

(4) Thermoplastic materials based on polyphenylene ethers, styrene polymers and polyoctenylenes as well as methods for their manufacture (See DE-OS No. 34 42 273)

(5) Thermoplastic molding materials (See DE-OS No. 35 09 092);

(6) Thermoplastic materials based on polyphenylene ethers and polyoctenylenes as well as methods for their manufacture (See German Patent Application No. P 35 18 277 of May 22, 1985);

(7) Impact resistant thermoplastic molding materials based on modified polyphenylene ethers, polyoctenylenes and polyamides (See German Patent Application No. P 35 18 278 of May 22, 1985).

It is known that homopolystyrene can be homogenously blended with PPE in any quantity ratio. With other plastics one obtains mixtures having two or more phases, each having special combinations of characteristics. The mixture of these polymers with the PPE can be improved by adding suitable agents. Examples of such additives are esters of phosphoric acid as well as compounds capable of reducing the boundary surface tension between the components of the polymer mixture.

It appears almost obvious that only polymers with a low proportion of volatile substances should be employed. If necessary, therefore, the polymers should be degasified prior to their blending. The same considerations hold for the additives, if they are of high molecular weight.

The determination of the content of volatile components takes place with the aid of thermogravimetry. A somewhat simpler, modified method is to heat a weighed granulated quantity of the molding material at 230° C. in a vacuum for 30 minutes and to calculate the weight loss. A third possibility is to determine the quantity of low molecular weight components in a solution of the material in chloroform using gas chromatography. The two methods mentioned first yield largely analogous results.

According to the invention, all known liquid or solid agents and other additives for such products, as well as pigments and reinforcing materials, can be added to the molding materials in a known manner.

The maximum temperatures of the mixtures of PPE and the other employed polymers that prevail after the mixing are indicated below as reference points for the performance of the present invention. For mixtures with polystyrenes and caoutchouc modified styrene polymers and caoutchoucs, the temperature should not exceed 280° C.; for polyamides it should not exceed 260° to 285° C., depending on the respective melting point.

The present method primarily comes into consideration when the PPE is not removed from a solvent after the oxidative linkage, but rather is manufactured according to the so-called "direct isolation method."

A particular advantage of the method is that in order to blend the PPE with the polymers and/or additives, only an extremely short, non-intensive mixing zone is necessary in the extruder, so that the thermal stress is truly reduced to a minimum.

The following non-limiting examples are given for illustration of the invention and are not intended to be limiting thereof. The listed percentages relate to the weight of the components or the mixture. To check the product characteristics the molding materials were injected into mold elements at the cylinder temperature listed in the Table and at a tool temperature of 90° C.

EXAMPLES

A 90 wt.% solution of poly-1,4-(2,6-dimethylphenylene ether) in toluene (reduced specific viscosity (RSV)=0.55 dl/g, 0.5% solution in chloroform, 25° C). is pressed at a temperature of 240° C. into the closed housing of a double screw extruder. As this occurs a large portion of the solvent evaporates through a rear degasification opening in the extruder. Two additional degasification openings lie in the product conveyance direction, the last of which operates with a vacuum of 30 hPa. A nozzle for the introduction of a liquid degasification promoter is arranged between these two degasification openings. The material temperature, which is controlled with a temperature detector, is set at 340° C. shortly before and in the area of the last degasification opening. This temperature increase is achieved both by means of a housing heater as well as by means of increased kneading within the zone of the kneader. This process is known to a person skilled in the art. The subsequent portions of the machine housing are set at 230°–249° C. to cool the degasified molten PPE means, so that the molten mass has reached a temperature of from 300° to 310° C. by the time it reaches the zone in which the additional polymer is introduced.

The additional polymers are melted in a melting extruder and, depending on the type, are introduced into the primary extruder for the molten PPE mass at 170° to 230° C. According to the quantity ratio and original temperatures, a temperature of from 230° to 285° C. is established in the mixture. A kneading block with three staggered kneading discs is used as the mixing zone.

The product is removed as a molten strand, cooled and granulated.

COMPARATIVE EXAMPLES

An 85% PPE solution at 190° C. according to DE-OS No. 33 15 803 was mixed with a molten mass of a caoutchouc-modified polystyrene in an extruder and the mixture was subsequently degasified in two degasification zones in the machine at 270° C. In one of the comparison tests the degasification took place at 350° C.

TABLE 1

| Example No. | Composition | | | | Temp. After Mixing C. | Volatile Components (ppm) | Cylinder Temp. of Injection Moulding Machine | Notched Impact Resistance DIN 53 453 (kJ/m) | Surface Appearance |
|---|---|---|---|---|---|---|---|---|---|
| | (PPE)[1] % | HIPS[2] % | Polyoctenylene[3] % | Other % | | | | | |
| 1 | 90 | — | 10 | — | 285 | 300 | 290 | 18 | smooth, light |
| 2 | 60 | 30 | 10 | — | 264 | 420 | 270 | 17 | smooth, light |
| 3 | 60 | 40 | — | — | 270 | 380 | 270 | 15 | smooth, light |
| 4 | 60 | 40 | — | — | 270 | 10200[6] | 270 | 15 | smooth, light |
| 5 | 40 | 50 | — | 10 Rubber[4] | 250 | 320 | 270 | 17 | smooth, light |
| 6 | 55 | 25 | 10 | 10 SB[5] | 255 | 290 | 270 | 15 | smooth, light |
| 7 | 40 | — | 10 | 50 polyamide 12 | 260 | 300 | 270 | 19 | smooth, light |
| A | 60 | 40 | — | — | — | 1800 | 270 | 13 | streaked |
| B[7] | 60 | 40 | — | — | — | 450 | 270 | 8 | smooth, dark |
| C | 45 | 55 | — | — | — | 950 | 270 | 12 | cloudy, rough |

Footnotes to the Table
[1] The polyphenylene ether is obtained through the oxidative linkage of 2,6-dimethylphenol, stopping of the reaction and subsequent reaction extraction according to DE-OS 33 13 864 and OS 33 23 777. The solvent is sufficiently removed through evaporation that the proportion of volatile components at the entrance to the extruder is about 10%.
[2] VESTYRON 616 ®, a product of the company Huels AG, D-4370 Marl 1, is employed as the caoutchouc-modified polystyrene (HIPS). Data characterizing this product can be found in the brochure "Plastics by Huels VESTRYON, published in September 1979.
[3] A polyoctenylene with a J value of 120 ml/g and a trans-content of 80% was used. Such a product can be obtained commercially under the name VESTENAMER 8012 ® Additional characterizing data relating to this product are contained (Manufacturer: HUELS AG, D-4370 Marl 1). in the publication "Kautschuk, Gummi, Kunstoffe" 1981, pp. 185 to 190 as well as the Huels Notice No. 2247"VESTENAMER 80128". The polyoctenylene can also be manufactured, for example, in the manner presented by K. J. Ivin "Olefin Metathesis", Academic Press, pp. 236 (1983), and the additional references given therein
[4] This is granular, carbon-containing caoutchouc of the designation BT 7370, a product of the Bunawerke Huels GmbH, having 60% SBR caoutchouc and 40% carbon. Additional data can be obtained from the production information "BUNA EM-Pulverbatch" (1985).
[5] This is a polymer blend consisting of 60 parts of a styrene-butadiene-copolymer (85 parts of styrene and 15 parts of butadiene) and 40 parts of an
E-SBR-caoutchouc (weight ratio styrene/butadiene 23.5: 76.5). Both components are obtained in a known manner through radical emulsion polymerization.
[6] In this test, 5% water, relative to the PPE, was added as a degasification promoter.
[7] In test example B the degasification temperature was raised experimentally to 350° C.
[8] As the polyamide 12, the type VESTAMID L 1900 ® of the company Huels AG D-4370 Marl was used. The characteristic data of this product are contained in the VESTAMID ® brochure (September 1983).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for the manufacture of molding materials containing polyphenylene ether, comprising the steps of:
    (i) degasifying molten polyphenylene ether for a period of time from about 0.1 to about 3 minutes in a temperature range from about 290°–370° C.;

(ii) adding at least one additional molten polymer to said degasified molten polyphenylene ether; and (iii) blending said degasified molten polyphenylene ether and said addittional molten polymer, wherein the residual content of volatile components in said degasified molten polyphenylene ether is less than 500 ppm.

2. The method of claim 1, wherein said degasifying, adding and blending steps are performed in a forced conveyor.

3. The method of claim 2, wherein said forced conveyor is a double-screw kneader.

4. The method of claim 1, wherein X is the ratio between the viscosities of said degasified molten polyphenylene ether and said additional molten polymer and wherein $0.5 > X > 2.0$.

5. The method of claim 4, wherein $0.8 > X > 1.2$.

6. The method of claim 1, wherein said additional molten polymer contains additives selected from the group consisting of pigments, reinforcing materials and esters of phosphoric acid.

7. A molding material comprising polyphenylene ether and comprising less than 500 ppm volatile components, obtained by the method of claim 1.

8. The method of claim 1, wherein said temperature range is from about 320° to about 350° C.

9. The method of claim 1, wherein said additional polymer has a content of volatile components less than 200 ppm.

10. The method of claim 1, wherein the temperature of said blending step does not exceed 285° C.

11. The method of claim 10, wherein said temperature does not exceed 260° C.

12. The method of claim 1, wherein said molten polyphenylene ether comprises at least 0.1% volatile components.

13. The molding material of claim 7, further comprising less than 250 ppm volatile components.

* * * * *